INVENTOR.
LUCIUS N. SMITH
ALEXANDER SMITH
BY
*Jennings & Carter*
ATTORNEYS

Patented June 23, 1953

2,642,711

UNITED STATES PATENT OFFICE 2,642,711

CUTTER AND BREAKER BAR FOR LAWN MOWERS

Lucius N. Smith and Alexander Smith, Montverde, Fla.

Application March 4, 1950, Serial No. 147,661

2 Claims. (Cl. 56—255)

This invention relates to lawn movers of the type embodying cutters mounted for rotation in a horizontal plane, and particularly to an improved means associated with the cutters which shall aid in preventing long grass, vines and the like from entangling with or wrapping around the cutters and the shaft on which they are mounted. One type of mower with which the apparatus of the present application may be associated is shown in our copending application Serial No. 6,364, filed February 5, 1948, now Patent No. 2,564,586.

Our invention contemplates a cutter assembly for a lawn mower embodying a horizontally rotatable member carrying cutters, and a member mounted for rotation with the cutter bar and having portions disposed out of the plane of rotation of the cutters, and preferably, though not necessarily, angularly displaced from the cutters, whereby tall grass, weeds, vines and the like cut by the cutters is struck by such portions, preventing the same from fouling the cutter bar, cutters, or shaft supporting the same.

A further and more specific object is to provide a cutter assembly for lawn mowers of the character designated in which the member associated with the cutters is in the form of a bar having upturned ends, and in which the bar is mounted on the shaft at substantially right angles to the member carrying the cutters.

A further object of our invention is to provide our improved type of breaker bar with a horizontal rotatably cutter assembly for grass and weed cutting apparatus of the type wherein the cutter bar is downturned on its ends where the cutting blades are mounted, our breaker bar being of less length than the cutting circle inscribed by the blades and provided with the aforementioned upturned ends.

A still further object is to provide an antifouling member for horizontally rotatable grass, weed and vine cutting apparatus which shall have the functional advantages above mentioned without impairing in any way the efficiency of the cutting apparatus.

A lawn mower having associated therewith our improved breaker bar is illustrated in the accompanying drawing forming a part of this application in which.

Figure 1:
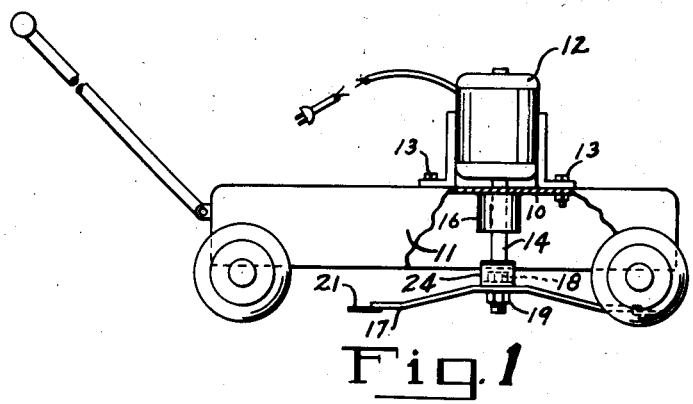
Fig. 1 is a side elevational view of the lawn mower, partly broken away.

Referring now to the drawings for a better understanding of our invention, our improved apparatus may be associated with a lawn mower having a body 10 with a downturned flange 11 extending there around. A driving motor 12 for the blades may be secured to the body 10 by means of bolts 13. Extending downwardly through the body and operatively connected to the motor 12 is a shaft 14 which is mounted in a suitable bearing 16 secured to the body as shown in Fig. 1.

Figure 2:
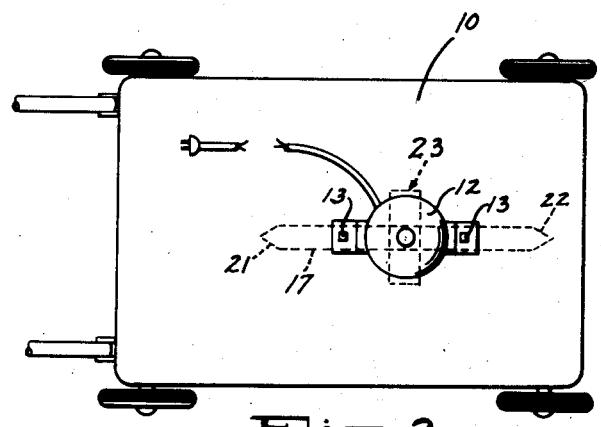
Fig. 2 is a plan view.
Figure 3:
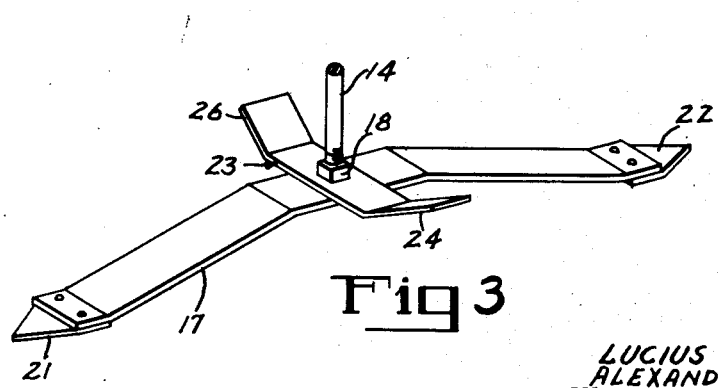
Fig. 3 is a detail perspective view of the cutter and breaker bar assembly.

Mounted on the threaded lower end of the shaft 14 is a horizontally disposed cutter bar 17 which is vertically adjustable on the shaft by means of nuts 18 and 19 to vary the height at which grass, weeds, vines and the like are to be cut. The cutter bar 17 may be of the type which slopes downwardly and outwardly from the shaft 14, and has mounted on its outer ends horizontally disposed cutting blades 21 and 22. As will be seen in Fig. 2, the cutting blades preferably are confined within the downturned flange 11, whereby the mower may be brought into close proximity to trees, curbs and the like without the blades contacting the same.

Our improved breaker bar 23 is mounted on the shaft 14 directly above the cutter bar 17 and preferably extends at right angles thereto. The breaker bar 23 is provided with upturned ends 24 and 26 which are disposed to strike, break up or throw outwardly of the rotating assembly any long grass, vines, weeds and the like which may be cut by the cutting blades 21 and 22 and move or fall inwardly thereof, thus preventing the same from wrapping around the shaft 14.

In the operation of a lawn mower embodying our invention it will be seen that the breaker bar 23 engages and throws out long grass and the like cut by the blades, and places such grass again in the path of the cutting elements 21 and 22. Thus, in addition to preventing long grass and weeds from becoming wrapped about the shaft 14, our improved breaker bar causes the longer grass to be again cut by the blades. The upturned ends 24 and 26, being out of the plane in which long stalks of grass must lie in order to wrap about the shaft 14 or cutter bar 17, strike such grass and throw it into the path of the rotating cutting elements or actually tears or breaks the same apart before it can become entwined about the shaft or cutter bar.

While we show our improvement as being in the form of a separate bar with upturned ends mounted on the shaft 14, it will be appreciated from the disclosure herein that the same may comprise one or more pieces of material such as the ends 24 or 26 secured directly to the bar 17.

Likewise, while we prefer to use flat stock for making our improved bar 23 so as to have relatively sharp edges to strike, break and tear the grass coming into contact therewith, the same may be formed of material of other shape.

From the foregoing it will be apparent that we have invented an improved grass, weed and vine cutting assembly for use in mowing apparatus and the like. While we illustrate the same in association with a somewhat conventional lawn mower it will be understood that our invention has utility in association with other grass, weed and vine cutting apparatus embodying horizontally disposed, rotatable cutters. In actual practice we have found that our invention is satisfactory in every way, economical of construction, and that the same does not interfere with the operation of the cutting mechanism with which it is associated.

While we have shown our invention in but one form, it will be obvious to those skilled in the art that it is not so limited, but is susceptible of various changes and modifications, without departing from the spirit thereof, and we desire therefore, that only such limitations shall be placed thereupon as are specifically set forth in the appended claims.

What we claim is:

1. In apparatus for cutting grass embodying a vertically disposed driven shaft and a horizontally disposed grass cutting member operatively connected to said shaft, the combination of a breaker bar having upturned ends mounted on the shaft above the cutting member for rotation therewith and substantially normal thereto, the overall length of said breaker bar being less than that of said cutting member.

2. Apparatus as defined in claim 1 in which said breaker bar comprises a flat bar non-rotatably secured adjacent its longitudinal center to the grass cutting member with its flat side horizontal, said upturned ends on said flat bar lying out of the plane of the intermediate portion thereof.

LUCIUS N. SMITH.
ALEXANDER SMITH.

References Cited in the file of this patent

UNITED STATES PATENTS

| Number | Name | Date |
|---|---|---|
| Re. 18,944 | Beazley | Sept. 12, 1933 |
| 1,207,580 | Luce | Dec. 5, 1916 |
| 1,805,927 | Sharp | May 19, 1931 |
| 2,192,762 | Vincze | Mar. 5, 1940 |
| 2,245,821 | Poynter | June 17, 1941 |
| 2,505,952 | Fergason | May 2, 1950 |